(No Model.)
F. P. MARGOT.
STUMP PULLING MACHINE.
No. 318,996. Patented June 2, 1885.
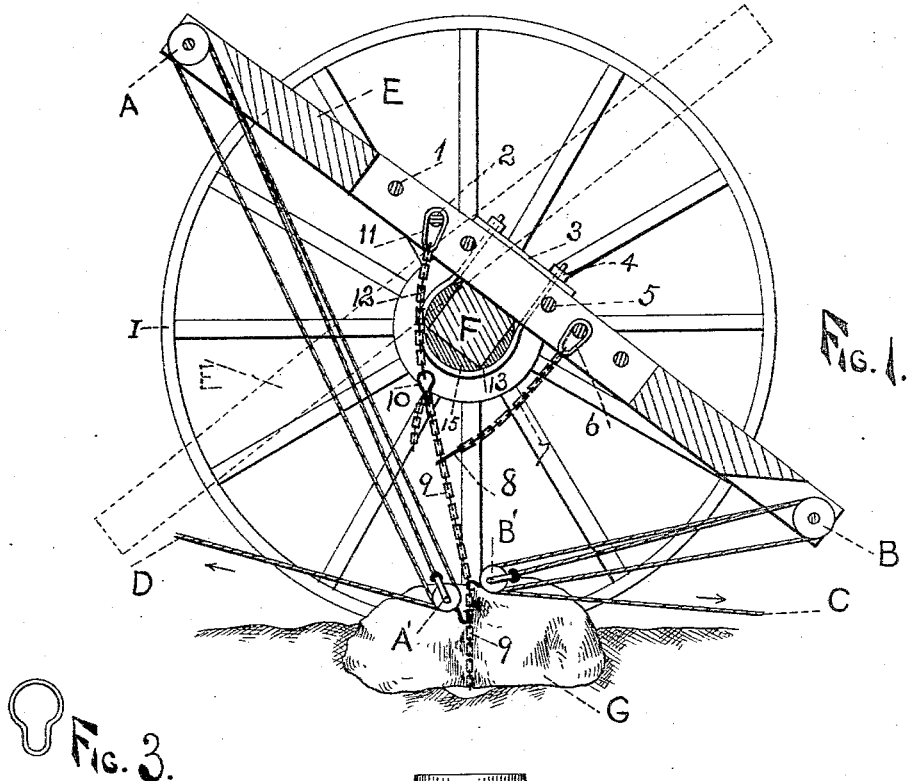
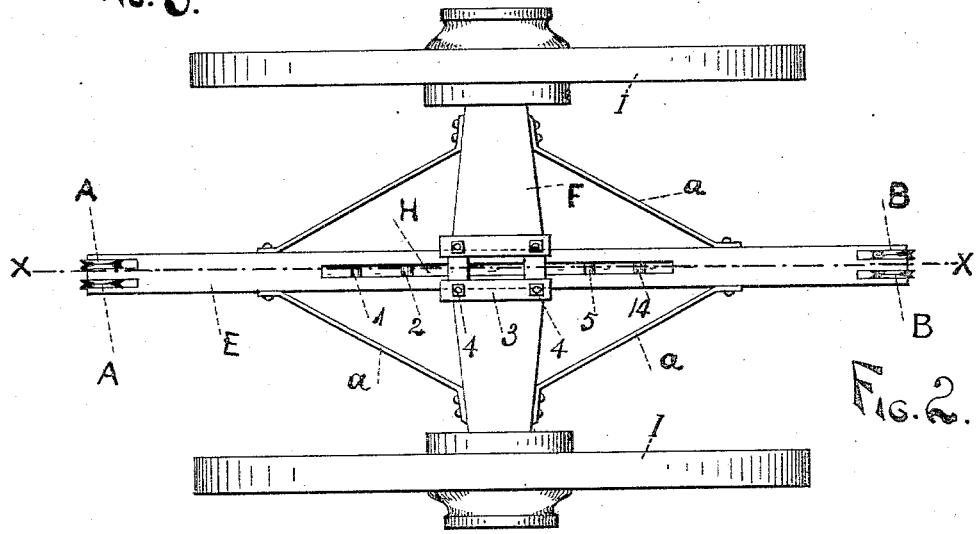
WITNESSES:
Henry D Jones
Alvah W. Brown
INVENTOR
Francis P Margot
BY Dennis L. Rogers
ATTORNEY

UNITED STATES PATENT OFFICE.

FRANCIS P. MARGOT, OF GLENN, MICHIGAN.

STUMP-PULLING MACHINE.

SPECIFICATION forming part of Letters Patent No. 318,996, dated June 2, 1885.

Application filed November 3, 1884. (No model.)

*To all whom it may concern:*

Be it known that I, FRANCIS P. MARGOT, of Glenn, Allegan county, State of Michigan, have invented a new and useful Improvement in Stump-Pulling Machines, of which the following is a specification, reference being had to the accompanying drawings.

My invention relates to that class of stump-pulling machines which are mounted upon two wheels of sufficient height to admit of the machine standing over the object to be lifted, (stump or stone,) and in which the lifting or pulling is done by an accumulation of strains produced by a rocking beam arranged across the axle of the machine; and the object of my invention is to produce a machine which combines the elements of lightness and strength with great pulling capacity, and is transportable upon its own wheels, carrying with it the stone or stump after it is raised from its bed.

Referring to the drawings, Figure 1 is a vertical sectional view; Fig. 2, vertical plan view. Fig. 3 shows the form of the grab-link hereinafter mentioned.

F represents the axle, mounted upon wheels I I, and supports the rocking beam E, which is secured thereon near the middle by the clamps 13, having plates 3 and nuts 4, which inclose the convex packing-blocks 15, (preferably of cast-iron,) which are secured to said axle near the middle, forming a sort of drum and acting as a protection for the axle, and also making an additional leverage or purchase by binding against the chain when the machine is in operation, as hereinafter described. The rocking beam E has also the vertical slot H, through which are passed the pins 1, 2, 5, and 14, two upon either side of the axle, and has the sheaves A A and B B, respectively, in either end. Chains 7 and 12, of suitable length, and having large links 6 and 11, through which the pins 1 or 2 or 5 or 14, as desired, are passed, and having grab-links 8 and 10, of the form shown in Fig. 3, at the opposite end, through which is passed the grab-chain 9, are placed upon either side of axle F. Tackle-blocks A' and B', having lines C and D, respectively, rove through them, and passing over sheaves A A and B B, are placed at either end of rocking-beam E.

G represents the stone or object to be raised; *a a a a*, braces.

In operating the machine a third grab-link, of the form shown in Fig. 3, is used, as hereinafter described. The grab-chain 9 is simply a length of ordinary cable-chain without hooks.

The method of operating the machine is somewhat shown in Fig. 1. The machine being placed above the object to be raised, the grab-chain 9 is passed around the object and secured by the loose grab-link above described, the short end of the chain being jammed into the small part of the link, allowing the longer free end to slide freely, thus producing a slip-knot, in which the object is securely inclosed. The free end of the chain is then passed upward through the grab-link 8 of the chain 7 and caught in grab-link 10 of chain 12. Tackle-block B' being secured to the object G or chain 9 at G, power now being applied to line C in the direction shown by the arrow, the end of rocking-beam E is depressed, thus elevating the opposite end and tightening the chains 12 and 9. Grab-link 8 being now moved along chain 9 nearer the object, rocking beam E is reversed by removing the power from C and applying it at D in the direction shown by the arrow upon that side, thus causing the beam E to assume the position shown in dotted line, and removing the strain from chain 12 to chain 7. The free end of chain 9 now being passed through grab-link 10 until link 10 meets link 8, the position of beam E is reversed, as above described, transferring the strain from one chain to the other, and gaining somewhat in distance at each change of position until the object is raised clear from the ground. Then the line holding the end of the beam down being secured, the machine may be moved as desired, carrying the object suspended beneath the axle.

What I claim as new, and desire to secure by Letters Patent, is—

1. In a stump-pulling machine, the combination of wheels I I, axle F, and rocking beam E, having the slot H, provided with pins 1 2 5 14, and sheaves B B and A A, arranged in the ends thereof, respectively, mounted on said axle F, and rigidly secured by straps 13, plates 3, and nuts 4, and braces *a a a a* with packing blocks or bearings 15, arranged upon three sides of said axle, and the chains 7 and 12, having grab-links 8 and 10 arranged in said slot H, substantially as described.

2. In a stump-pulling machine, the combination of the wheels I I, axle F, and rocking beam E, having the slot H, provided with pins 1 2 5 14, and sheaves B B and A A, arranged in the ends thereof, respectively, mounted on said axle, secured by straps 13, plates 3, nuts 4, and braces *a a a a*, and packing blocks or bearings 15, arranged upon three sides of said axle, the chains 7 and 12, having grab-links 8 and 10 arranged in said slot H, tackle-blocks B' and A', having lines C and D, respectively, arranged and adapted to actuate beam E in conjunction with sheaves A A and B B, substantially as described, and chain 9, adapted to act in conjunction with said chains 7 and 12, substantially as described.

FRANCIS P. MARGOT.

Witnesses:
DENNIS L. ROGERS,
ALVAH BROWN.